Feb. 26, 1957 P. J. CHRISTY ET AL 2,782,863
PROPELLER GOVERNOR MECHANISM
Filed Aug. 2, 1952 3 Sheets-Sheet 1
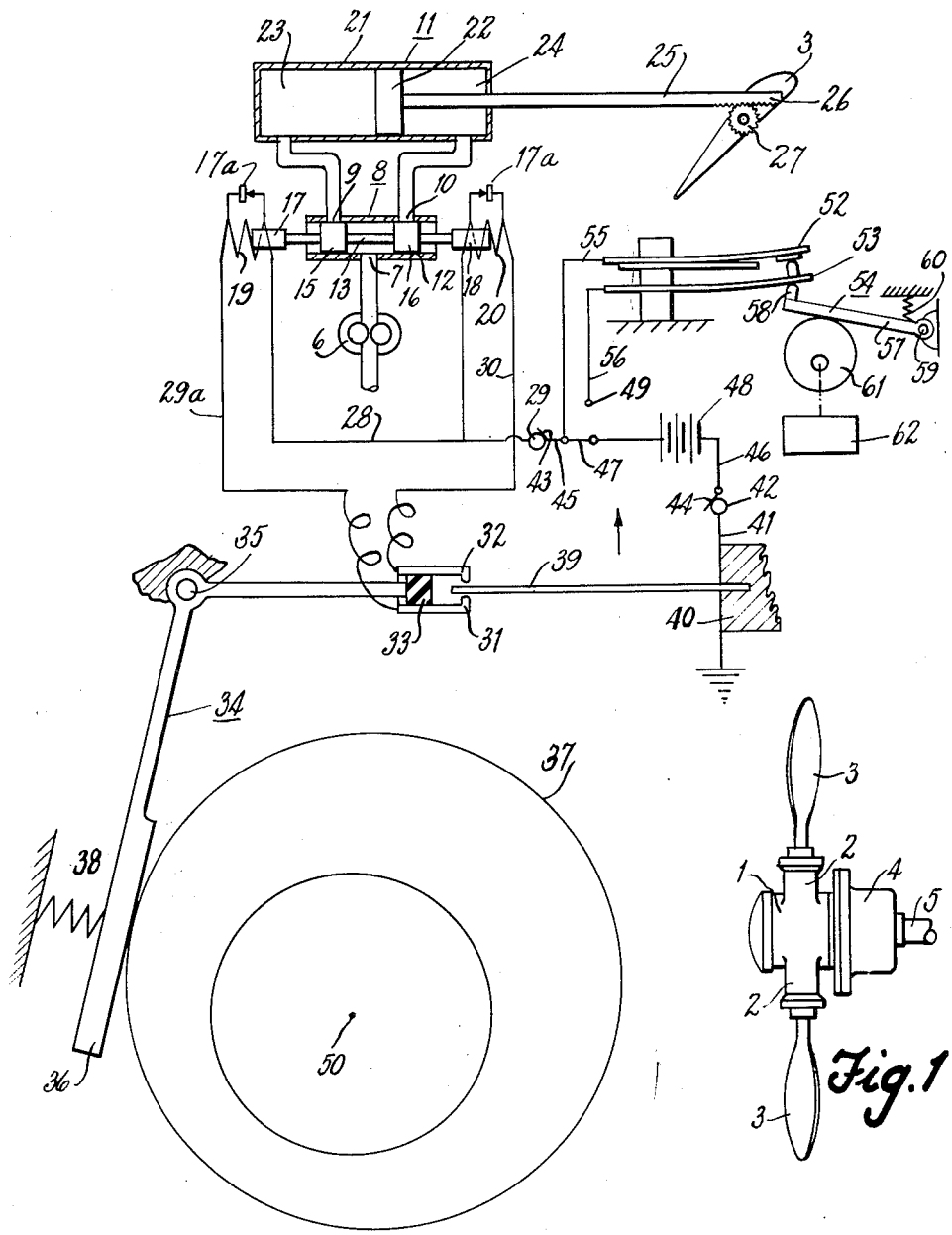
INVENTORS
PAUL J. CHRISTY
ALBERT P. DINSMORE

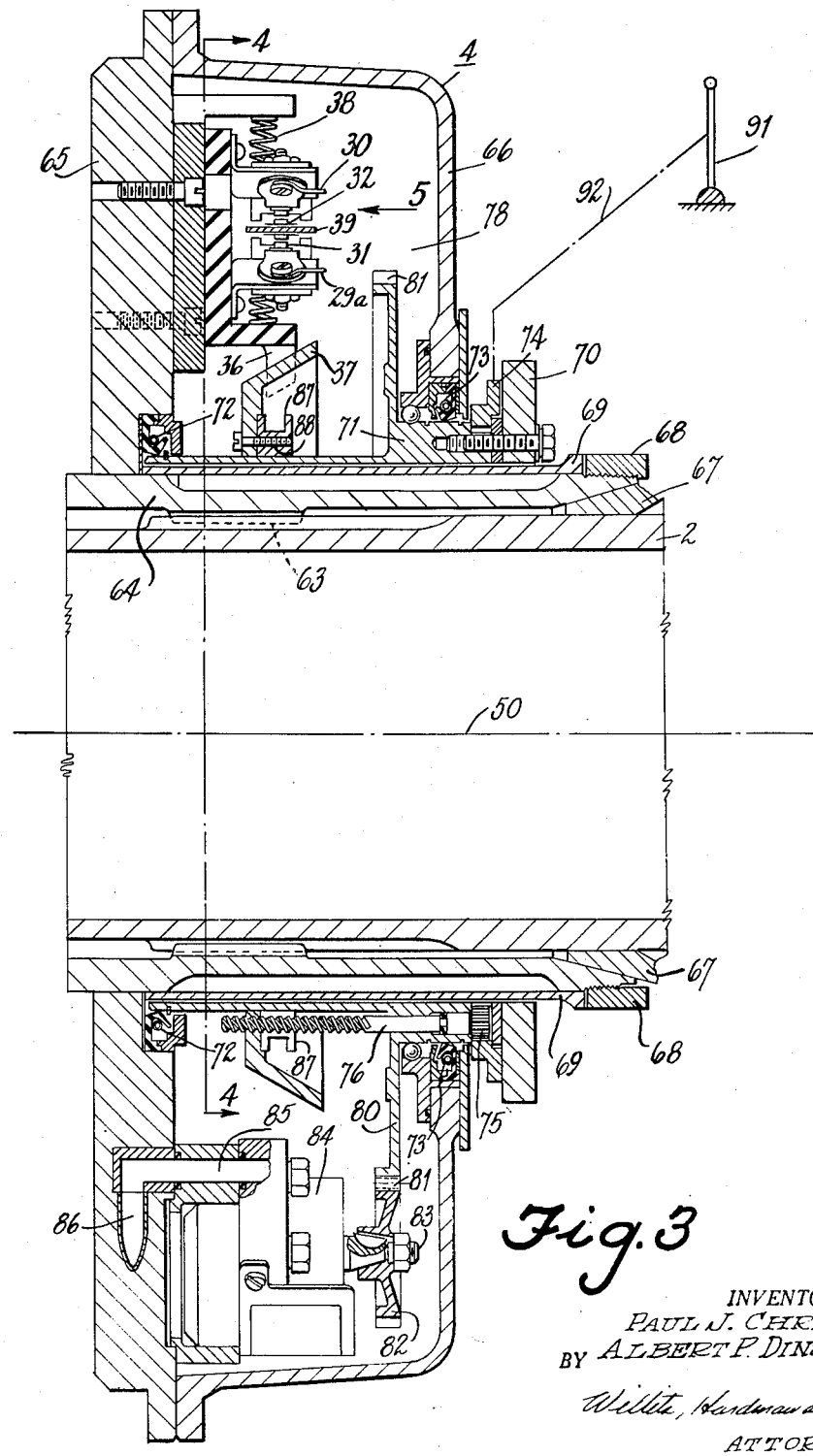

Feb. 26, 1957 P. J. CHRISTY ET AL 2,782,863
PROPELLER GOVERNOR MECHANISM
Filed Aug. 2, 1952 3 Sheets-Sheet 3

INVENTORS
PAUL J. CHRISTY
BY ALBERT P. DINSMORE

ATTORNEYS

_United States Patent Office_

2,782,863
Patented Feb. 26, 1957

2,782,863
PROPELLER GOVERNOR MECHANISM

Paul J. Christy and Albert P. Dinsmore, Dayton, Ohio, assignors to General Motors Corporation, Detroit, Mich., a corporation of Delaware Application August 2, 1952, Serial No. 302,442

9 Claims. (Cl. 170—160.17)

The present invention relates to mechanism for governing the speed of a prime mover and more particularly to governor mechanism for a prime mover adapted to drive a variable pitch propeller.

Governor mechanisms for variable pitch aircraft propellers are generally extremely complex in nature and, consequently, rather costly. Accordingly, one of our objects is to provide a propeller governing mechanism that is simple in design and relatively inexpensive to manufacture without sacrificing the automatic, accurate speed control functions requisite in mechanisms of this character.

The aforementioned and other objects are accomplished in the present invention by providing a centrifugally actuated electro-fluid pressure system associated with a rotatable propeller assembly. Specifically, the governor mechanism of the instant invention, which is particularly adaptable for incorporation in an aircraft propeller of the type having a rotatable regulator enclosing a fluid pressure actuating system, includes a cam operated switch and a centrifugally positioned contact reed. The cam operated switch is disposed in the rotatable regulator so that it functions to energize alternately each of two solenoid valve windings once per propeller revolution. In other words, during each revolution of the propeller, the solenoid valve undergoes one pulse cycle of energization.

The solenoid actuated valve controls the application of fluid pressure pulses to opposite sides of blade actuating torque unit means. If the pulse cycle comprises alternate fluid pressure pulses of equal time duration to opposite sides of the torque unit means, no movement thereof will ensue. These conditions prevail during propeller rotation in accordance with a predetermined selected speed level. However, should an off-speed condition occur, the pulse cycle will be differentially altered and will comprise alternate fluid pressure pulses of unequal time duration to be applied to opposite sides of the torque unit means. In this instance, the torque unit means will be actuated to alter the pitch position of the propeller blades in a manner to correct the off-speed condition to again effect propeller rotation in accordance with the selected speed level. The character of the pulse cycle and, consequently, the respective time durations of the alternate fluid pressure pulses applied to opposite sides of the torque unit means, is controlled by the centrifugally and cam actuated switch assembly. In addition, the governor mechanism may be provided with further means enabling the operation of one or more propellers to be synchronized with any suitable reference speed source.

Further objects and advantages of the present invention will be apparent from the following description, reference being had to the accompanying drawings wherein a preferred embodiment of the present invention is clearly shown.

In the drawings:

Fig. 1 is a perspective view of a variable pitch propeller.

Fig. 2 is a schematic view illustrating the component parts of the governing mechanism of the present invention.

Fig. 3 is an enlarged sectional view of the fluid pressure regulator shown in Fig. 1.

Figure 5:
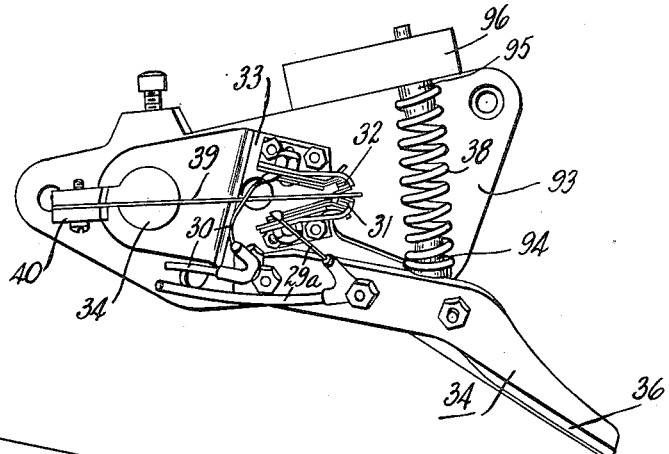
Fig. 5 is a view taken in the direction of arrow 5 of Fig. 3 showing the switch assembly.

Referring particularly to Fig. 1, a variable pitch propeller is shown comprising a hub 1 provided with a plurality of radially extending sockets 2. The sockets 2 are adapted to receive blades 3, the blades being journaled therein for rotation about their longitudinal axes. Attached to the propeller hub 1, and rotatable therewith, is a fluid pressure regulator 4. The regulator 4 houses a fluid pressure system which supplies hydraulic fluid medium under pressure to torque units enclosed within the hub structure 1 in a manner generally similar to that disclosed in the Blanchard et al. Patents 2,307,101 and 2,307,102. The propeller structure, including the hub, the blades, and the regulator, is adapted to be driven by a shaft 5, which is rotated by any suitable type of aircraft propeller prime mover, not shown.

Referring to the schematic representation of the governing mechanism, as shown in Fig. 2, the means for effecting movement of propeller blades 3 will be first described. These means, including a pump 6, which supplies fluid under pressure to a supply port 7 of a solenoid valve 8, having control ports 9 and 10, which are connected to opposite sides of torque unit or servomotor means 11, are similar to the system disclosed in copending application, Serial No. 92,043, filed May 7, 1949, now U. S. Patent 2,681,116, in the name of Robert C. Treseder. Solenoid valve 8 includes a valve guide 12 having disposed therein a plunger 13 with spaced lands 15 and 16. Opposite ends of the plunger 13 are secured to armatures 17 and 18, which cooperate with solenoid windings 19 and 20, respectively. Each of the windings 19 and 20 has disposed in parallel connection therewith a rectifier 17a, which is utilized for arc suppression. The solenoid valve 8 is of a construction similar to that disclosed in copending application, Serial No. 97,724, filed June 8, 1949, now U. S. Patent No. 2,630,136 in the names of Roy H. Brandes and Robert C. Treseder. The torque unit means 11 are schematically shown as comprising a cylinder 21 having disposed therein a movable piston 22. The piston 22 divides the cylinder 21 into a decrease pitch chamber 23 and an increase pitch chamber 24, which chambers are respectively connected to ports 9 and 10 of the solenoid valve 8 by suitable passage means. The piston 22 is also shown schematically as having a rod 25 provided with a rack 26 on the free end thereof, which rack meshes with a pinion gear 27 operatively connected with the propeller blades 3. Structurally, the torque unit means 11 take a form similar to that shown in the aforementioned copending application, Serial No. 92,043.

Solenoid windings 19 and 20 are connected by a common lead 28 to a slip ring 29. In addition, solenoid winding 19 is connected by conductor 29a to a switch contact 31, while solenoid winding 20 is connected by conductor 30 to a switch contact 32. Contacts 31 and 32 are rigidly supported on, and separated by, an insulating member 33, which comprises one end of a lever assembly 34. Lever assembly 34 is pivoted at 35, and the other end thereof is formed as a cam follower 36. The cam follower portion 36 is urged against a stationary eccentric cam 37 by means of a compression spring 38. Disposed in the space between contacts 31 and 32 is one end of a contact reed 39, the other end of which is anchored in a supporting structure 40. The reed 39 is composed of spring steel and, accordingly, has mass and resilient physical properties. The reed 39 is connected by conductor 41 with a slip ring 42. The several parts so far described are mounted either within the regulator 4 or within the hub 2, and all of these parts, except the eccentric cam 37, rotate with the propeller shown in Fig. 1, about an axis 50. The schematically shown slip rings 29 and 42 may take a structural form similar to that shown in the previously referred to copending application, Serial No. 92,043. The slip rings 29 and 42 are engaged, respectively by brushes 43 and 44. Brush 43 is connected by lead 45 to a contact of a switch 47, while brush 44 is connected by lead 46 to one terminal of an electric power source 48. Switch 47 is connected to the other terminal of power source 48 and is utilized to control the connection of a synchronizing mechanism to be described. Suffice it here to say that if the switch 47 is in the position shown in Fig. 2, governing without synchronization with a reference speed source is obtained, while if it is moved into engagement with contact 49, the governor mechanism will have superimposed upon it a synchronizing signal.

The switch assembly, including cam 37, lever 34, contacts 31 and 32, and reed 39, are utilized to control the energization of solenoid windings 19 and 20. All of the rotating elements, except the torque unit means 11 and the blades 3, are mounted within the regulator 4, as is the stationary eccentric cam 37. For clarity of description, let us consider for the moment that all the several elements heretofore described, except the cam 37, are stationary and the cam rotates about axis 50. It is then readily apparent that relative rotation between the eccentric cam 37 and the cam follower portion 36 of the lever 34 will impart a motion to the lever 34 which when plotted against time, approximates a sine wave motion. Accordingly, portion 33 of the lever and contacts 31 and 32, which are attached thereto, will be moved about point 35 as a pivot. The several parts are so designed that the clearance between spring reed 39 and contacts 31 and 32 is small as compared to the throw of the cam 37 and, hence, the spring reed 39 is carried along with the contact assembly 31 and 32 during movement of the lever 34. However, due to the contact clearance, the reed 39 is not continuously moved by the contact assembly 31 and 32 and, thus, a hiatus occurs (travel time between contacts) during which the reed 39 is not contacted with either of the contacts 31 or 32. It is also apparent that due to the construction of eccentric cam 37 and for a given position of reed 39, contacts 31 and 32 may be engaged with the lever 39 for equal periods of time during one revolution of the eccentric cam 37. One relative revolution about axis 50 of lever 34 around the stationary eccentric cam 37 supplies one pulse cycle of energization to the solenoid valve 8. The pulse cycle includes a predetermined period of energization of winding 19, while winding 20 is deenergized; thence, a relatively shorter period in which neither of the windings is energized due to the hiatus; thence, a period of time in which a solenoid winding 20 is energized and solenoid winding 19 is deenergized; and thence, a second hiatus period in which neither of the windings is energized.

During each pulse cycle of solenoid winding energization, the plunger 13 will be moved to the left during energization of winding 19, as viewed in Fig. 2, thereby connecting supply port 7 with control port 9 and applying fluid to decrease pitch chamber 23, while increase pitch chamber 24 is simultaneously exposed to drain through port 10. In the hiatus period the plunger will return to the position shown in Fig. 2, wherein all communication between the supply port 7 and the torque unit means 11 is blocked. During energization of solenoid winding 20, the plunger 13 will move to the right and connect chamber 24 with the supply port 7 while exposing chamber 23 to drain through port 9. During the following hiatus period, the plunger will again return to the position it appears in the drawing. The plunger 13 is caused to return to the neutral position during deenergization of both solenoid windings 19 and 20 by means of centering springs, not shown, which act on opposite sides of the plunger, as is more particularly described in the previously referred copending application, Serial No. 97,724. If the windings 19 and 20 are energized for time periods of equal duration, the fluid pulses, which are applied to opposite sides of the piston 22, will not effect any change of the mean pitch position of the blades 3. However, if the solenoid windings 19 and 20 are energized for periods of time of unequal duration, it is apparent that the pulses of fluid applied to one of the chambers of the torque unit means will effect movement of the piston 22 and a consequent change in the pitch position of the blades 3. The character of the pulse cycle, that is the relative time duration of the energization of windings 19 and 20, is determined by the switch assembly including contacts 31, 32, reed 39, lever 34, and eccentric 37, in a manner to be described.

Now considering that all of the several elements, except the stationary eccentric cam 37, are rotating about the axis 50, the spring reed 39, by virtue of its own mass, and the mass of contact assembly 31, 32, will have an equilibrium position under the opposing forces of centrifugal force and the inherent resiliency of the reed itself. The contact assembly 31, 32 will still have imparted thereto a motion approximating a sine wave due to relative motion between lever 34 and the eccentric cam 37. If the propeller is rotating at the predetermined selected speed level, the equilibrium position of the reed 39 under the opposing forces acting thereon, will be such as to cause the reed to be in engagement for equal periods of time with contacts 31 and 32 during each revolution of lever 34 around cam 37. Under these conditions, the character of the pulse cycle of solenoid energization is such that the windings 19 and 20 will be alternately energized for periods of equal time duration. This will effect fluid pulse application to opposite sides of the torque unit means 11 of equal time duration, in which instance no net movement thereof will be effected and the mean pitch position of the blades 3 will remain stable. These conditions prevail during propeller operation in accordance with the selected speed level, or the on-speed condition.

The position of the contact assembly at which neither of the contacts 31 and 32 is in engagement with the reed 39 will vary with the equilibrium position of the reed. Thus, if the equilibrium position of the reed is shifted in a clockwise direction about member 40, due to greater centrifugal force, a greater rotational movement of the contact assembly 31, 32 about pivot 35 in a counterclockwise direction will be necessary to obtain a condition wherein neither of the contacts engage the reed 39. Conversely, should the equilibrium position of the reed shift in a counterclockwise direction about member 40, due to lesser centrifugal force, a greater movement of the contact assembly about its pivot in a clockwise direction will be necessary to obtain a condition wherein neither of the contacts engage the reed 39. Accordingly, it may be said that the equilibrium position (no engagement between the reed and either of the contacts 31 or 32) varies with speed and/or speed setting.

If the propeller is operating above the selected speed level, the equilibrium position will be different than that during an on-speed condition. This is due to the fact that centrifugal force acting in the direction of arrow 51 will tend to move the reed 39 clockwise about its end affixed to member 40. This phenomenon shifts the neutral position of the contact assembly whereby the character of the pulse cycle of solenoid energization will be altered when the contact assembly has imparted thereto an oscillatory motion. Thus, contact 32 will be in engagement with the reed 39 for a longer period of time during each revolution, than will contact 31 be in engagement with reed 39. In this manner, the character of the pulse cycle energization applied to the solenoid valve 8 will be such that during each pulse cycle, winding 20 will be energized for a longer period of time than will winding 19, the relative difference between the time periods of energization of windings 19 and 20 being dependent upon the amount of overspeed. Accordingly, fluid pulses of greater time duration will be applied to increase pitch chamber 24 than will be applied to decrease pitch chamber 23 and the piston 22 will undergo a net movement toward the left, as viewed in Fig. 2, whereby blades 3 will be moved to an increased pitch position. An increase in the pitch position of the propeller blades 3 will impose a greater load upon the prime mover, thereby resulting in a reduced speed thereof and a return of the propeller speed to that of the selected speed level. When propeller speed has again reached the selected speed level of operation, the equilibrium position of the reed 39 will have moved counterclockwise about the member 40 in response to the resultant reduction in centrifugal force, so that the pulse cycle is of the character described in connection with the on-speed condition. Similarly, if an under-speed condition occurs, the character of the pulse cycle energization supplied to the solenoid valve 8 will be such that winding 19 will be energized for a greater period of time for each revolution than will winding 20. This will result in movement of the piston 22 and the blades 3 to a lesser pitch position thereby reducing the load and enabling the prime mover to accelerate to the selected speed level.

In the presence of speed errors in normal governing operation it is only the equilibrium position of the reed which shifts, and when the system is pulsing, the contact assembly carries the reed through, or at least to, the equilibrium position. Resultant blade angle correction rates are proportional to speed error. When speed error is sufficiently great to shift the equilibrium position beyond the excursion limits of the oscillating contact assembly pulsing ceases and a continuous hydraulic flow is delivered to the blade control servo to provide a solid (non-pulsing) pitch correction at the maximum blade angle change rate.

This invention includes means to synchronize the speed of operation of the propeller, illustrated in Fig. 1, with any suitable reference speed source, such as a master engine propeller combination or an outside reference speed source. It is to be understood that errors in setting the present governor, as well as relatively small speed errors common to all governors may be reduced by means of an error-integrating type of synchronizer. In synchronization the speed range of corrective control is limited to these relatively small speed errors.

As aforedescribed, during each pulse cycle of solenoid energization, produced by the switch assembly, a hiatus occurs twice per cycle due to clearance between contacts, and the duration of which is proportional to this clearance. During each hiatus, both solenoid windings 19 and 20 are deenergized. It is, thus, apparent that the current supply to the solenoid windings 19 and 20 could be disrupted during each hiatus without affecting governor operation.

In the instant invention synchronization control is effected by interrupting the current supply to the solenoid valve windings during every other hiatus, the duration of the interruptions being equal to the duration of the hiatus. During synchronous operation of the propeller and a reference speed index, the interruptions coincide with every other hiatus and, consequently, the pulse cycle of solenoid energization is not altered. However, within the limits of corrective synchronization control, the character of the pulse cycle will be altered when small variations of propeller speed from that of the reference speed index, cause the interruptions to fall out of coincidence with the hiatuses. Interruptions occurring at every other hiatus modify the pulse cycle of solenoid energization in such a manner as to trim the governor and provide fine speed control.

The synchronizing mechanism includes a pair of contacts 52 and 53, which are periodically opened by lever and cam assembly 54. Contact 52 is connected by lead 55 to the lead 45 and a switch point. Contact 53 is connected by lead 56 to switch contact 49. To obtain synchronization switch arm 47 is moved into engagement with contact 49. The cam and lever assembly includes a lever 57 having at one end an insulating member 58, which is adapted to engage contact 53 and having its other end pivoted at 59 to a supporting member. A spring 60, acting on lever 57, maintains the lever in engagement with the surface of a cam 61, which is shown as being rotated by a motor 62. However, if desired, the cam 61 may be driven by a master engine propeller combination. The synchronizing mechanism is of such a character that it interrupts the power applied to the solenoid valve windings 19 and 20 only once per revolution of the cam 61. Moreover, the duration of each interruption is made equal to the duration of a hiatus. Assuming the propeller is rotating at the same speed that the cam 61 is driven, the power supply of the solenoid windings 19 and 20 will be interrupted during every other hiatus of each pulse cycle for a period of time exactly coinciding with the hiatus' duration. In this instance it is readily apparent that the synchronizer has no effect on the pulse cycle produced by the governor switch assembly, which conditions prevail during the synchronization between the propeller speed and the motor driven cam 61 speed.

If we now assume that the propeller speed under control of the above described governor mechanism, due to a small error in governing referred to above, becomes slightly greater than that of the motor driven cam 61, the pulse cycle of solenoid energization produced by the governor switch assembly will be such as to call for substantially equal time periods of energization of solenoid windings 19 and 20 with hiatuses occurring therebetween. However, as the propeller speed becomes greater than that of the reference speed source driving cam 61, the control pulses produced by the governor switch assembly begin to occur at a higher rate than do the interruptions produced by the motor driven cam 61. Accordingly, the interruptions produced by the motor driven cam 61 will no longer coincide with every other hiatus period of the governor operated switch assembly, and the interruptions will begin to encroach upon periods of energization of solenoid winding 19. In other words, the synchronizer interruptions will reduce the time duration of solenoid winding 19 energization whereby solenoid winding 20 will be energized for a longer period of time during each pulse cycle than will solenoid winding 19. Accordingly, the fluid pulses applied by the solenoid valve 8 to the torque unit 11 will effect a movement thereof to cause the blades 3 to assume a slightly increased pitch position to effect a reduction of propeller speed so that it coincides with the reference speed source and the synchronizer cam 61. The return to synchronization of the propeller with the motor driven cam 61 will result in the interruptions produced by the synchronizer cam 61 again exactly coinciding with every other hiatus of the governor switch assembly. An underspeed condition of the propeller with respect to the synchronizer cam 61 will effect the duration of the energization of the solenoid winding 20 in a similar manner.

It is to be understood that when interruptions fall wholly within corrective pulses, the maximum control of the synchronizer is exerted. With interruptions occurring at every other hiatus there are two "patterns" or sequences possible, only one of which is proper for synchronization. If the interruptions occur in such time relation to the governor pulses as to trim the periods of energization to the wrong solenoid coil, the sense of the synchronization control is reversed, but such a condition is unstable and will not persist. There is only one "pattern" which is stable and capable of normal synchronization. If the synchronizer cam 61 is driven at a speed corresponding to one of the propellers of a multi-engine aircraft, the synchronizer mechanism will afford a means of synchronizing another, or a plurality of slave propeller combinations with the master propeller combination. Alternatively, the synchronizer cam 61 may be operated by an outside reference speed source, as is illustrated in the drawing. It is apparent that any master speed index capable of producing the desired interruptions will exert a direct control upon blade pitch without resetting the governor or being limited by governing inaccuracies, and will synchronize the propeller speed to that reference speed index. At the same time such an external master speed index provides a means of fine speed control for the governor mechanism.

Figure 4:
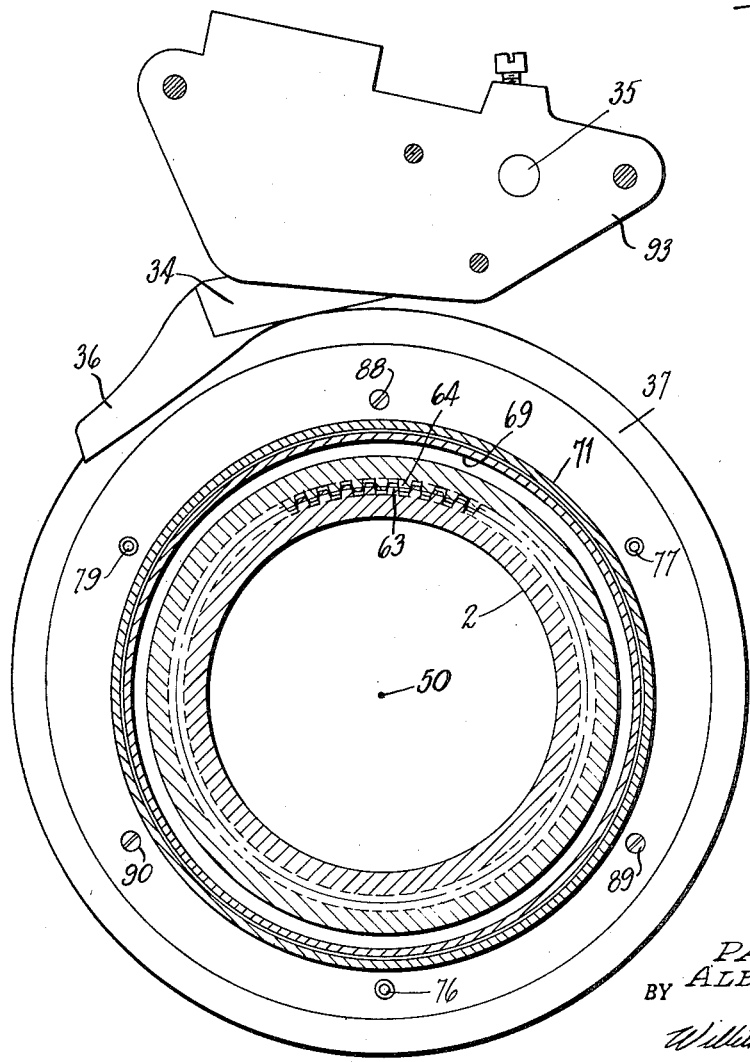
Fig. 4 is a sectional view taken along line 4—4 of Fig. 3 with some of the parts removed.

Referring to Figs. 3, 4 and 5, a preferred structural embodiment of the present invention will now be described. A propeller shaft 2 is keyed at 63 to a cylindrical extension 64 of the hub structure 1. Also secured to the hub structure 1 is a regulator front plate 65, which is flange connected to regulator cover 66. The hub extension 64 is maintained in position by a rear cone assembly 67, a nut 68 and a spacer sleeve 69. Spacially supported about the sleeve 69 is an adapter plate 70, which is connected by suitable means, not shown, to a rigid portion of the aircraft. The adapter plate 70 supports by screw devices an adapter sleeve assembly 71, which extends into the regulator and forms one wall of the reservoir within the regulator 4. Suitable sealing means 72 and 73 are positioned between the relatively rotatable parts of the adapter sleeve 71 and the regulator walls 65 and 66. An internally toothed ring gear 74 is journaled for rotation between the adapter plate 70 and the regulator cover 66, the teeth meshing with a plurality of pinion gears, only one of which, 75, is shown in Fig. 3.

The pinion gear 75 is anchored to one end of a high lead screw 76, which projects through an aperture in the adapter sleeve assembly 71 and into the reservoir 78, within the regulator 4. With reference to Fig. 4, three high lead screws 76, 77 and 79 are provided, these high lead screws being disposed substantially 120° apart. The adapter sleeve 71 is also provided with a radially extending flange 80, which is externally toothed at 81. The teeth 81 are adapted to mesh with a pinion gear 82, which is secured to a pump shaft 83 and operates a gear type pump disposed within a casing 84 that is secured to the front plate 66 within the regulator reservoir 78. The pump output is fed through a passage 85 and into a pocket 86 of the front plate 65 from whence it is distributed to the solenoid valve structure in a manner similar to that disclosed with reference to the previously referred to copending application, Serial No. 92,043. The pump within housing 84 is operated continuously during propeller rotation by reason of the relative rotative movement between gears 82 and the toothed portion 81 of the stationary adapter sleeve 71. The high lead screws 76, 77 and 79 threadedly engage a control ring 87, which is adapted for lineal movement upon the stationary adapter sleeve 71.

With reference to Figs. 3 and 4, the control ring 87 is attached by suitable screw devices 88, 89 and 90 to the eccentric cam 37 which takes the form of a truncated, eccentric cone. Riding upon the surface of the eccentric cam 37 is the cam follower portion 36 of the lever assembly 34. Rotation of ring gear 74 is effected by movement of a power lever 91 through mechanical linkage 92. In this manner rotation of the ring gear 74, which effects rotation of the high lead screws 76, 77 and 79 will effect a lineal movement along the adapter sleeve 77 of the control ring 87 and the cam 37. These means are provided to permit the selection of a plurality of speed levels for operation of the governor mechanism described in connection with Fig. 1. The relative position of the contact assembly 31 and 32 with respect to the reed 39 is determined by the portion of surface of eccentric cam 37 engaged by the cam follower portion 36 of the lever 34.

With particular reference to Fig. 5, the structural embodiment of the governor switch mechanism will be described. The entire switch mechanism is secured to a mounting pad 93, which is attached to the regulator front plate 65 by screw devices. The pivotal axis 35 of the lever 34 is likewise on the mounting pad 93. The lever 34 is provided with an upstanding abutment 94 upon which one end of spring 38 is seated. The other end of spring 38 is seated on a spring guide 95, which is formed on a bracket portion 96 attached to the mounting pad 93. The spring reed 39 is attached to the bracket 40 mounted on the pad 93. The lever 34 is composed of insulating material and contacts 32 and 33 are spacedly mounted thereon. The lead wires 29 and 30 are electrically connected to the contact assemblies 31 and 32 and are supported upon a portion of the lever 34.

From the foregoing, it is apparent that by rotating the high lead screws 76, 77 and 79 through movement through the ring gear 74 under the control of power lever 91, the position of the contact assembly 31 and 32 can be varied with respect to the position of the spring reed 39 by reason of axial movement of the eccentric cam 37 and pivotal movement of the lever 34. In this manner, any number of equilibrium positions of the spring reed 39 can be established whereby due to rotation of the regulator 4 about the axis 50, a pulse cycle of equal time duration solenoid energization can be effected for any desired speed. The synchronizing mechanism, shown in Fig. 1, is preferably disposed in the aircraft cockpit. In this manner, the cam 61 may be driven by any suitable means providing a reference speed index with which the speed of the propeller or propellers may be synchronized. Moreover, other modifications of the governor assembly are also readily apparent, such as substituting a rigid contact arm for the spring reed disclosed with a spring which opposes centrifugal force, or applying the oscillatory motion and/or the speed selective adjustment to the speed responsive element.

While the embodiment of the present invention as herein disclosed, constitutes a preferred form, it is to be understood that other forms might be adopted.

What is claimed is as follows:

1. In a fluid pressure system for varying the load on a prime mover for maintaining substantially constant speed operation thereof in accordance with a preselected magnitude, the combination comprising, a servo motor reversibly operable by fluid pressure to vary said load, a reciprocal valve for directing fluid pressure to opposite sides of said servo motor, means for continuously reciprocating said valve so that a succession of fluid pressure pulses are produced and delivered alternately to each side of the servo motor, a reference speed source, means including a cam and a centrifugally responsive member for substantially equalizing the duration of the alternate pulses delivered to each side of the servomotor for maintaining the load stable, means including said cam for differentially altering the duration of the alternate pulses delivered to each side of the servo motor for changing said load, and means for superimposing on said second and third recited means a pulse modification factor which alters the load on said prime mover to effect operation thereof in synchronism with said reference speed source.

2. In a variable pitch propeller of the type having a rotatable hub, a plurality of blades journaled in said hub for movement about their longitudinal axes, a regulator attached to and rotatable with said hub, a nonrotatable, eccentric member disposed within said regulator, a lever disposed in and rotatable with said regulator, said lever having a surface in engagement with said eccentric member, a source of electrical energy, a source of fluid under pressure, torque unit means within said hub and operatively connected with said blades for effecting pitch changing movements thereof, valve means in circuit connection between said source of fluid pressure and said torque unit means for effecting movement thereof, said valve means being electrically actuated, and switch means disposed within said regulator and rotatable therewith, said switch means being actuated in part by said lever and in part by centrifugal force due to rotation of said regulator for effecting energization of said valve means.

3. In a variable pitch propeller of the type having a rotatable hub, a plurality of blades journaled in said hub for movement about their longitudinal axes, a regulator attached to and rotatable with said hub, a stationary member coaxially disposed within said regulator and about which said regulator rotates, an eccentric member mounted on said stationary member, a lever disposed in and rotatable with said regulator, said lever having a surface in engagement with said eccentric member, a source of electrical energy, a source of fluid under pressure, torque unit means within said hub and operatively connected with said blades for effecting pitch changing movements thereof, valve means in circuit connection between said source of fluid pressure and said torque unit means for effecting movement thereof, said valve means being electrically actuated, and switch means disposed within said regulator and rotatable therewith, said switch means being actuated in part by said lever and in part by centrifugal force due to rotation of said regulator for effecting energization of said valve means.

4. In a variable pitch propeller of the type having a rotatable hub, a plurality of blades journaled in said hub for movement about their longitudinal axes, a regulator attached to and rotatable with said hub, non-rotatable cam means disposed within said regulator, follower means disposed in and rotatable with said regulator, means within said regulator and engaging said follower means for maintaining the same in engagement with said cam means, a source of electrical energy, a source of fluid pressure within said regulator, torque unit means within said hub and operatively connected with said blades for effecting pitch changing movement thereof, valve means in circuit connection between said source of fluid pressure and said torque unit means, said valve means being electrically actuated, and switch means disposed within said regulator and rotatable therewith, said switch means being actuated in part by said follower means and in part by centrifugal force due to rotation of said regulator for effecting energization of said valve means.

5. In a variable pitch propeller of the type having a rotatable hub, a plurality of blades journaled in said hub for movement about their longitudinal axes, a regulator attached to and rotatable with said hub, non-rotatable cam means disposed within said regulator, follower means disposed in and rotatable with said regulator, means within said regulator and engaging said follower means for maintaining the same in engagement with said cam means, a source of electrical energy, a source of fluid pressure within said regulator, torque unit means within said hub and operatively connected with said blades for effecting pitch changing movements thereof, valve means in circuit connection between said source of fluid pressure and said torque unit means, said valve means being electrically actuated, switch means disposed within said regulator and rotatable therewith, said switch means being actuated in part by said follower means and in part by centrifugal force due to rotation of said regulator for effecting energization of said valve means, and means operatively connected with said cam means for effecting lineal movement thereof relative to said regulator whereby the actuation of said switch means by said follower means may be altered.

6. In a variable pitch propeller having a rotatable hub, a plurality of blades journaled in said hub for movement about their longitudinal axes and a regulator attached to and rotatable with said hub, the combination including governing means disposed within said regulator for maintaining substantially constant speed propeller operation at any one of a plurality of speed levels, said governing means including a nonrotatable truncated, eccentric conical member disposed within said regulator for reciprocal movement and a lever disposed in and rotatable with said regulator, said lever having a surface in engagement with said truncated conical member, a source of electrical energy, a source of fluid under pressure, torque unit means within said hub and operatively connected with said blades for effecting pitch changing movements thereof, electrically actuated valve means in circuit connection between said source of fluid pressure and said torque unit means for effecting movement thereof, switch means disposed within said regulator and rotatable therewith, said switch means being actuated in part by said lever and in part by centrifugal force due to rotation of said regulator for effecting energization of said valve means, and means operatively connected with said eccentric member for effecting reciprocal movement thereof to determine the speed level of said governing means.

7. In a variable pitch propeller having a rotatable hub, a plurality of blades journaled in said hub for movement about their longitudinal axes and a regulator attached to and rotatable with said hub, the combination including a stationary member coaxially disposed within said regulator and about which said regulator rotates, governing means disposed within said regulator for maintaining substantially constant speed propeller operation at any one of a plurality of speed levels, said governing means including a nonrotatable truncated, eccentric conical member disposed within said regulator and mounted on said stationary member for reciprocal movement and a lever disposed in and rotatable with said regulator, said lever having a surface in engagement with said truncated conical member, a source of electrical energy, a source of fluid under pressure, torque unit means within said hub and operatively connected with said blades for effecting pitch changing movements thereof, electrically actuated valve means in circuit connection between said source of fluid pressure and said torque unit means for effecting movement thereof, switch means disposed within said regulator and rotatable therewith, said switch means being actuated in part by said lever and in part by centrifugal force due to rotation of said regulator for effecting energization of said valve means, and means operatively connected with said eccentric member for effecting reciprocal movement thereof to determine the speed level of said governing means.

8. Mechanism for governing the rotative speed of a prime mover through variation in the load imposed thereon, including in combination, a source of fluid pressure, a reversibly operable servo motor for varying the load on said prime mover, a solenoid actuated valve connected between said source of fluid pressure and said servo motor, a source of electrical energy, oscillatable switch means in circuit connection between said source of energy and said solenoid actuated valve, means for actuating said switch means to energize said solenoid valve, said mechanism including a source of reference speed, and means actuated by said reference speed source in circuit connection between said source of energy and said solenoid actuated valve for periodically interrupting the circuit connection between said source of energy and said valve to effect synchronism between prime mover speed and said reference speed source.

9. In a fluid pressure system for varying the load on a prime mover to maintain substantially constant speed operation thereof, the combination including, a servomotor reversibly operable by fluid pressure to vary said load, a solenoid actuated valve for directing fluid under pressure to opposite sides of said servo-motor, a source of electric power, oscillatable switch means in circuit connection between said source of power and said solenoid actuated valve, means including a cam and a centrifugally responsive member for actuating said switch means to energize said solenoid valve so that a succession of fluid pressure pulses are produced and delivered alternately to each side of said servo-motor, said last recited means substantially equalizing the duration of the alternate pulses delivered to each side of said servo-motor for maintaining the load stable, and means including said cam for differentially altering the duration of the alternate pulses delivered to each side of said servo-motor for changing said load.

References Cited in the file of this patent

UNITED STATES PATENTS

| | | |
|---|---|---|
| 915,716 | Wilkinson | Mar. 16, 1909 |
| 1,040,359 | Latimer | Oct. 8, 1912 |
| 1,881,724 | Lehrer | Oct. 11, 1932 |
| 2,182,014 | Clark | Dec. 5, 1939 |
| 2,220,028 | Smith | Oct. 29, 1940 |
| 2,334,967 | Thomas et al. | Nov. 23, 1943 |
| 2,405,488 | Briner | Aug. 6, 1946 |
| 2,448,458 | Ozanich | Aug. 31, 1948 |
| 2,449,452 | Chillson | Sept. 14, 1948 |
| 2,681,116 | Treseder | June 15, 1954 |